Nov. 30, 1965 H. E. KASTING 3,220,636
CLOSURE STRUCTURE FOR THERMOPLASTIC BAG
Filed May 15, 1963 2 Sheets-Sheet 1

INVENTOR.
HOWARD E. KASTING
BY
ATTORNEY

INVENTOR.
HOWARD E. KASTING
BY
ATTORNEY

United States Patent Office 3,220,636
Patented Nov. 30, 1965

3,220,636
CLOSURE STRUCTURE FOR THERMOPLASTIC BAG
Howard E. Kasting, Park Forest, Ill., assignor to Union Carbide Corporation, a corporation of New York
Filed May 15, 1963, Ser. No. 280,689
6 Claims. (Cl. 229—57)

This invention relates to a quadrangular closure structure for a bag made of heat-sealable thermoplastic film.

Thermoplastic film bags are usually made by forming a tube of the thermoplastic film and then closing at least one end of the tube. In order to close the end of such a tube, it is usually necessary to make joints between overlapping layers of film. In general, it is preferred to make these joints by heat sealing, i.e., by pressing the layers of film together at a temperature sufficient to weld the layers together.

In the manufacture of most thermoplastic film bags, and especially in the case of industrial bags made of heavy gauge film expected to withstand rough handling, it is preferred to form the closures in such a way that the stresses on the joints therein are exerted in shear rather than as a peeling force. Tensile tests have demonstrated that the strength of lap-seals, wherein stresses are transmitted in shear, (hereinafter referred to as shear seals) are generally at least twenty times stronger than face-to-face seals, wherein stresses are transmitted so as to peel apart the film plies (hereinafter referred to as peel seals).

Whereas peel seals can usually be made with all the sealing elements outside the bag, the making of shear seals often requires one of the sealing elements, usually a back-up platen, to be inside the bag. This is not only a difficult and cumbersome operation from the standpoint of manipulating the element inside the bag, but such an operation is also not readily adaptable to automatic bag making by machine.

Another objection to many closure structures heretofore proposed has been that they permit the bag contents to penetrate between the plies of film in the final closure and eventually leak out of the bag. This leads to losses of the packaged material and is also unsightly and distorts the bag shape.

It is, therefore, the main object of the present invention to provide an improved closure structure for thermoplastic film bags in which the main load of the bag contents is borne by shear seals.

It is another object of the invention to provide such a closure structure which can be made without having a sealing element inside the bag.

A further object of the invention is to provide such a closure structure which prevents penetration of the bag contents between the plies of film in the closure.

Other aims and advantages of the invention will be apparent from the following description and appended claims.

Figure 1:
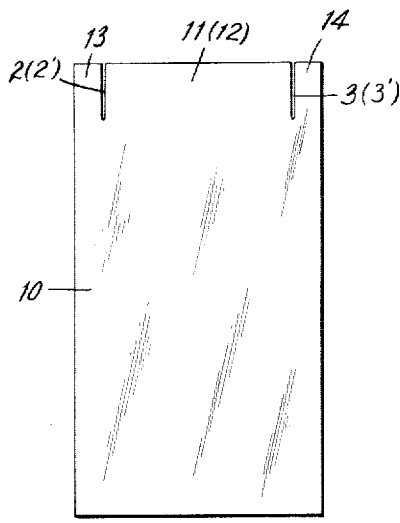
FIGS. 1 and 1b are front elevation and isometric views, respectively, of a bag blank for use in forming a preferred embodiment of the inventive closure structure.

In accordance with the present invention, there is provided a quadrangular closure structure for a thermoplastic film bag having two pairs of opposed side walls forming a quadrangular opening therebetween, the closure structure comprising a membrane sheet of thermoplastic film covering the quadrangular opening and joined to a first pair of opposed side walls, the second pair of opposed side walls having extensions thereon which are infolded over the outer surface of the membrane sheet so as to overlap each other, the extensions being heat sealed to each other in the overlap.

By providing one pair of the opposed side walls of the bag with extensions which are infolded in overlapping relationship and then heat sealed together in the overlap, the inventive closure structure provides a shear seal for bearing the main load of the bag contents. Moreover, by providing a membrane sheet of film which covers the bag opening inside the overlapping extensions, the subject closure structure permits the shear seal between the overlapping extensions to be made from outside the bag, such as by inserting a back-up platen between the membrane sheet and the overlapping extensions.

In a preferred embodiment of the invention, product-retention seals are made by joining the membrane sheet to the second pair of opposed side walls having the extensions thereon, or to the extensions, and then infolding those portions of the membrane sheet and side walls containing the product-retention seals along with the overlapping extensions. Since the side edges of the membrane sheet are then joined to all four side walls, or to extensions thereof, the bag contents cannot penetrate between the plies of film in the final end closure. Moreover, since those portions of the membrane sheet containing the product-retention seals are infolded over the outer surface of the membrane sheet, the main load of the bag contents is still borne by the shear seal between the overlapping side wall extensions, and all the heat seals in the end closure can still be made without the use of any internal sealing elements.

The invention will be described in more detail by referring to the drawings.

Figure 1B:
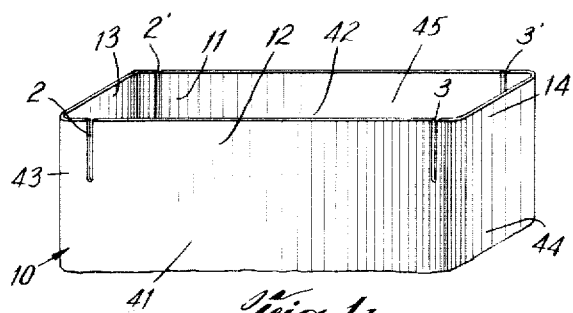
Figure 2:
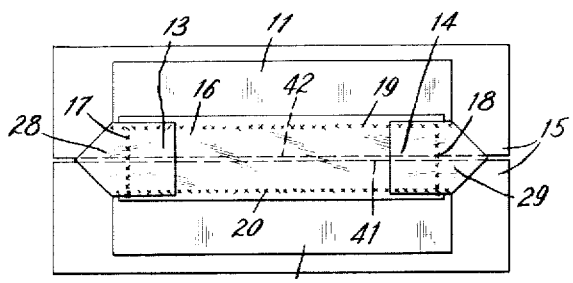
FIGS. 2 and 3 are top views illustrating the various steps in forming a closure structure in the blank of FIG. 1.
Figure 3:
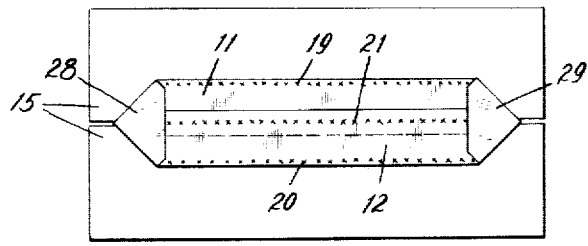

A bag blank for forming one preferred embodiment of the invention is shown in FIGS. 1 and 1b, and the steps involved in forming the inventive end closure in this blank are illustrated in FIGS. 2 and 3. Referring to FIG. 1, the bag blank comprises a flattened tube 10 of thermoplastic film having at its upper end four slits 2, 2' and 3, 3' extending longitudinally inward from the end of the tube so as to form a pair of opposed similar side flaps 11, 12 and a pair of opposed similar end tabs 13, 14. When the tubular blank of FIG. 1 is opened, it appears as shown in FIG. 1b, i.e., two pairs of opposed side walls 41, 42 and 43, 44 form a quadrangular opening 45 therebetween. As can be seen in FIG. 1b, the end tabs 13, 14 are actually integral extensions of a first pair of opposed side walls 43, 44, while the side flaps 11, 12 are integral extensions of the other pair of opposed side walls 41, 42.

In order to form the end closure in the bag blank, the tube 10 is clamped in flattened form in a split platen 15 (FIGS. 2 and 3) with the side flaps, the end tabs, and a portion of each side wall extending above the platen surface. The two side flaps 11, 12 are then outfolded in opposite directions onto the platen 15, which causes the end tabs 13, 14 to infold. The outfolding of the side flaps 11, 12 also outfolds those portions of the side walls 41, 42 extending above the platen surface and forms triangular pockets 28 and 29 in the corresponding portions of the side walls 43, 44.

After the side flaps 11, 12 have been outfolded, a sheet 16 of thermoplastic film is inserted over the outfolded portions of the side walls 41, 42 and under (or over) the infolded end tabs 13, 14. The sheet 16 is at least as wide as the end tabs and is long enough to bridge the gap between, and overlap at least the ends of, the infolded end tabs. Thus, the sheet 16 completely covers the rectangular opening between the two pairs of opposed side walls 41, 42 and 43, 44. As shown in FIG. 2, the ends of the sheet 16 are joined to the end tabs 13 and 14 by heat seals 17 and 18, respectively, and the side edges of the sheet 16 are joined to the underlying side walls 41, 42 by heat seals 20 and 19, thus forming a liquid-tight closure. The heat seals 19 and 20 also join the side edges of the end tabs 13, 14 to the sheet 16 and the side walls 41, 42 thereunder.

The seals 17 and 18 are preferably made before the seals 19 and 20 are made so that a back-up platen can be inserted between the sheet 16 and the underlying side walls 41, 42 to prevent the seals 17 and 18 from sealing the sheet to the side walls. After the seals 17 and 18 have been made, the back-up platen is withdrawn, and the seals 19 and 20 are made against the platen 15. Thus, the seals 17, 18, 19, and 20 are all made without the use of an internal former or other internal sealing member.

Referring now to FIG. 3, after the seals 17, 18, 19, and 20 have been made, the side flaps 11 and 12 are infolded along with those portions of the end tabs 13 and 14, the sheet 16, and the side walls 41 and 42 containing the seals 19 and 20. In other words, the side flaps and other members are infolded along lines extending along the inner edges of the heat seals 19 and 20. The side flaps 11, 12 overlap each other when they are infolded and are joined to each other in the overlap by a heat-seal 21. The seal 21 is preferably made by inserting a back-up platen between the infolded side flaps on the top and the sheet 16 and infolded end tabs on the bottom.

Figure 4:
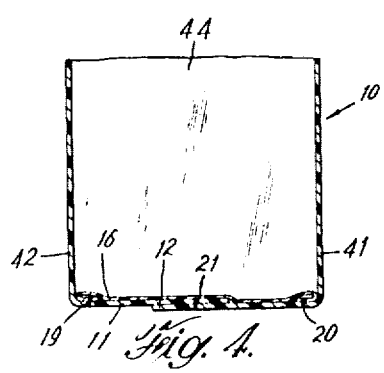
FIG. 4 is a cross-sectional view showing the structure of the closure in FIG. 3.

As can be seen in the cross-sectional view of the final closure structure in FIG. 4, the seals 19 and 20 are actually product-retention seals which prevent penetration of the bag contents down between the sheet 16 and the side flaps 11, 12. As can also be seen in FIG. 4, the infolding of those portions of the sheet 16, the end tabs 13 and 14, and the side walls 41 and 42 containing the retaining seals 19 and 20 causes the load of the bag contents to be borne mainly by the seal 21, which is a shear seal, rather than by the seals 19 and 20, which are peel seals.

Figure 5:
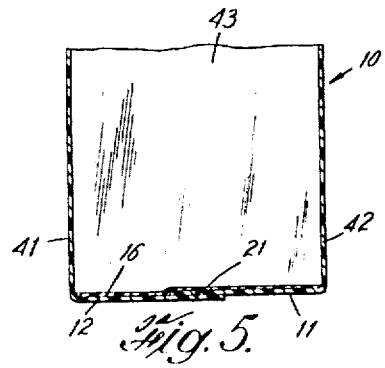
FIGS. 5 and 5a are cross-sectional and plan views, respectively, of a modified closure structure made from the blank of FIG. 1.
Figure 5A:
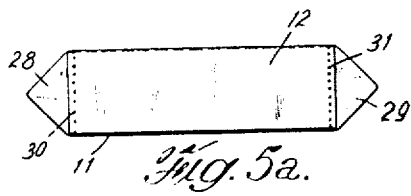

Numerous modifications of the closure structure of FIGS. 1–4 will be apparent to those skilled in the art. For example, the sheet 16 could be made wider than the end tabs 13, 14 and then sealed to the side flaps 11, 12 rather than the side walls 41, 42. Also, if it is not necessary for the closure to prevent penetration of the packaged product between the film plies, the seals 19 and 20 can be omitted so that the final closure appears as shown in FIG. 5. As can be seen from FIG. 5, there is no need to infold any portion of the sheet 16 in this case. However, in order to prevent leakage through such a closure, it is usually necessary to make the side flaps 11, 12 long enough to completely overlap each other, i.e., across the full flap width, and then seal the side edges of the flaps together across the overlap, as by the seals 30 and 31 in FIG. 5a.

In the aforedescribed embodiments of FIGS. 1–5, the entire membrane sheet is formed by a sheet 16 which is initially not joined to the side walls 43 and 44; this sheet 16 is subsequently joined to the side walls 43 and 44 by heat sealing the sheet to integral extensions of those side walls, i.e., to the end tabs 13 and 14. However, it will be apparent that the term "membrane sheet joined to a first pair of opposed side walls" includes numerous other closure structures. A few typical examples of such structures are shown in FIGS. 6–9, in each case with the side flaps on the second pair of side walls being still unfolded.

Figure 6:
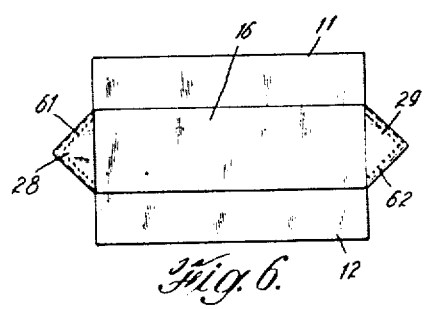
FIGS. 6–9 are plan views of several modified embodiments of the inventive closure structure, each structure being shown with the side flaps still outfolded.

In FIG. 6, the end tabs are deleted and the ends of the membrane sheet 16 are provided with integral triangular extensions which protrude into the triangular pockets 28 and 29 at the edge folds of the tubular blank. The triangular extensions on the sheet 16 are then joined by heat seals 61 and 62 to the upper plies of the tubular pockets. The seals 61 and 62 may be made by inserting triangular back-up platens between the triangular extensions of the sheet 16 and the lower plies of the triangular pockets 28 and 29.

Figure 7:
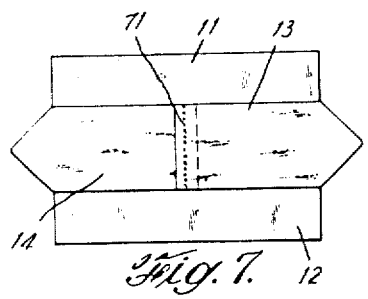

In FIG. 7, the end tabs 13 and 14 are made sufficiently long that they overlap when infolded. The overlapping tabs are then joined together in the overlap by a heat seal 71, which may be made by inserting a back-up platen between the infolded tabs and the underlying side walls. In this case, the entire membrane sheet is formed by the end tabs 13 and 14, which are integral extensions of the first pair of side walls.

Figure 8:
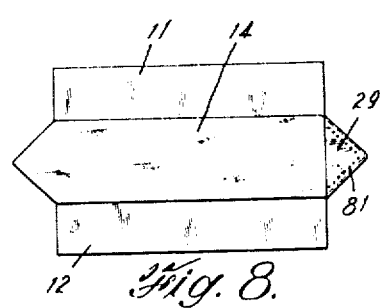

In FIG. 8, the one tab 14 is deleted and the other end tab 13 is made sufficiently long that it extends completely across the bag opening. The end of the tab 13 is provided with an integral triangular extension which protrudes into the triangular pocket 29. The triangular tab extension is joined to the upper ply of the triangular pocket 29 by a heat seal 81, which may be made by inserting a triangular back-up platen between the tab extension and the lower ply of the triangular pocket. In this case, the entire membrane sheet is formed by the single tab 13.

Figure 9:
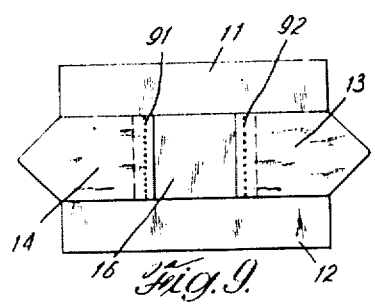

In FIG. 9, the end tabs 13 and 14 are longer than in FIGS. 1–4, but not long enough to overlap when infolded. The gap between the infolded tabs 13 and 14 is bridged by a separate sheet 16, which overlaps the ends of the tabs and is joined thereto by heat seals 91 and 92. The heat seals 91 and 92 may be made by inserting a back-up platen over the bag side walls under the tabs 13 and 14 and the sheet 16.

It should be apparent from the foregoing series of exemplary structures that the term "membrane sheet joined to a first pair of opposed side walls," as used herein, includes not only structures where an initially non-integral sheet is sealed to said opposed side walls or to integral extensions thereof, but also structures wherein integral extensions of said side walls actually form a part or all of the membrane sheet. Also, as can be seen from the above examples, any seals made in the forming of the membrane sheet, whether to join integral extensions to each other or to side walls or to join non-integral sheets to integral extensions or to side walls, should be shear seals. For example, seals 17, 18, 61, 71, 81, 91, 92 described above are all shear seals when the bag is finally filled.

In each of the embodiments of FIGS. 6–9, the closure is preferably provided with product-retention seals by sealing the side edges of the integral end tabs and/or the non-integral sheet to the underlying side walls. Also, the portions of the end tabs, sheets, and side walls containing these product-retention seals should be infolded along with the side flaps 11 and 12 so that the main load of the bag contents is borne by the seals between the overlapping side flaps. In each of these cases, a cross-section of the resulting closure structure appears as shown in FIG. 4. Alternatively, however, the product-retention seals along the side edges of the tabs and sheets may be omitted, and a closure structure formed as in FIG. 5. In order to prevent leakage through such closures, it is usually necessary to have the side flaps 11 and 12 overlap each other across the full flap width and to seal the side edges of the flaps together across the overlap, as described above in connection with FIG. 5a.

In any of the aforedescribed embodiments, the closure structure shown can be used to provide a convenient filling opening for the bag if only one or none of the product-retention seals, such as seals 19 and 20 in FIG. 2, is made. For example, referring to FIG. 2, if only the heat seal 19 is omitted, a filling opening is provided between the sheet 16 on the top and the side flap 11 and the adjacent side wall on the bottom. After the bag has been filled, the side flaps are infolded and heat sealed together as described.

As a typical example of the invention, four three-inch long vertical slits 2, 2' and 3, 3' were made in the end of a square-end cut thirty-two inch long polyethylene flattened tube 10 of twenty-one inch flat width and 10 mil (0.010 inch) wall thickness (FIG. 1). These slits formed a pair of opposed similar side flaps 11 and 12 measuring three inches by fourteen and one-quarter inches, and a pair of opposed similar end tabs 13 and 14 measuring three inches by six and three-quarter inches.

All heat seals made in this tube material in subsequent operations were made by using a sealing-bar temperature of 750° F. for a time of about 0.8 second. A suitable heat-sealing device is described in a copending United States patent application bearing Serial No. 198,014, filed May 28, 1962, and entitled "Plastic Film Welding Process and Apparatus."

The slit tube was positioned between and grasped by the two halves of a split platen 15 (FIG. 2) along a fold line such that six and three-eighth inches of the top end of the tube extended above the platen. The two side flaps 11 and 12 were outfolded in opposite directions onto the platen, and the two end tabs 13 and 14 were infolded onto the side walls, the portions of the tube above the platen and below the end tabs being folded in a "diamond" fold with the angles at the folded edges of the tube being about 90°.

A strip of polyethylene film, a little wider than the end tabs 13 and 14 and long enough to bridge the gap between, and to overlap at least the ends of, the infolded end tabs 13 and 14, was applied as a membrane 16 either above or below the end tabs. A thin metal conventional heat-seal back-up plate was inserted between the membrane 16 and the outfolded side wall and side flaps 11 and 12, and heat-seals 17 and 18 were made between the membrane 16 and the end tabs 13 and 14 in the conventional manner of applying pressure with a heated bar. The back-up plate was withdrawn and heat seals 19 and 20 were made, using the platen 15 as a back-up plate, joining the sides of the end tabs and the sides of the membrane to each other and to the side walls of the tube along a line three and one-quarter inches from the end of the tube 10.

The side flaps 11 and 12 were then infolded and overlapped (FIG. 3) by one and one-half inches. A thin metal back-up plate five and five-eighths inches wide was placed just under the overlapped flaps, and a heat seal 21 was made, joining the flaps, the bag was then removed from the platen. The result was a liquid-tight, strong, satchel-bottom closure substantially perpendicular to the bag walls.

It will be apparent that without substantial change, the invention may be applied to other heat-sealable thermoplastic resin film, both clear and filled, colored or pigmented, of various thicknesses, and to produce sacks and bags of various sizes and either open or closed, with or without valves, single walled or multi-walled, and using either seamless or seamed tubing.

In none of the heat-sealing operations described herein, is it necessary to insert either the heating bar or the back-up bar within the bag, i.e., all operations are conducted above the split platen 15. Thus, the invention is well adapted for automatic machine manufacture of bags from thermoplastic resin film.

While various specific forms of the present invention have been illustrated and described herein in some detail, it will be apparent that the same are susceptible of numerous modifications. For example, tubular valves or other elements may be incorporated in the closure structure. Also, although the invention has been described with particular reference to the use of heat sealing to join the desired portions of film together, the invention is equally applicable to closure structures made by the use of adhesives or other joining means.

What is claimed is:

1. An industrial shipping bag formed from a tubular bag blank of heat-sealable thermoplastic film having, at least at one end, a quadrangular, sift-proof closure structure comprising, in combination,
   (a) two pair of opposed side walls forming a quadrangular opening therebetween;
   (b) a separate membrane sheet of heat-sealable thermoplastic film extending over and completely covering said quadrangular opening;
   (c) a pair of continuous heat-seals which directly seal the ends of said membrane sheet to the ends of a first pair of opposed side walls in their common area of overlap; and,
   (d) a further continuous heat-seal which directly seals the second pair of opposed side walls only to each other in their common area of overlap, said common area of overlap being defined by extensions on said second pair of side walls which extensions are infolded in overlapping relationship to each other over the outer surface of said membrane sheet.

2. The closure structure of claim 1 wherein said first pair of opposed side walls are provided with integral extensions which are infolded in overlapping relationship with the ends of said membrane sheet, said membrane sheet and said extensions of said first pair of side walls being heat-sealed in the overlap.

3. The closure structure of claim 1 wherein said membrane sheet consists of a pair of infolded overlapping integral extensions of said first pair of opposed side walls, said overlapping extensions being heat-sealed together in the overlap.

4. The closure structure of claim 1 wherein said membrane sheet is a separate sheet which is provided with extensions which overlap said first pair of opposed side walls, said extensions of said sheet being heat-sealed to said side walls in the overlap.

5. The closure structure of claim 1 wherein said membrane sheet consists of a single infolded integral extensions of one of said first pair of opposed side walls, said extension overlapping the opposite side wall and being heat-sealed thereto in the overlap.

6. An industrial shipping bag formed from a tubular bag blank of heat-sealable thermoplastic film having, at least in one end, a quadrangular sift-proof closure structure comprising, in combination;
   (a) two pair of opposed side walls forming a quadrangular opening therebetween;
   (b) a separate membrane sheet of heat-sealable thermoplastic film extending over and completely covering said quadrangular opening;
   (c) two pair of continuous heat-seals which directly seal said membrane sheet to said two pair of side walls in their common areas of overlap, one pair of said heat-seals intersecting the other pair of heat-seals and one pair of said side walls having extensions thereon which are infolded, together with overlapping portions of said membrane sheet, in overlapping relationship to each other; and (d) a further continuous heat-seal which directly seals only the folded and overlapping extensions of said side walls to each other in their common area of overlap.

References Cited by the Examiner

UNITED STATES PATENTS

| | | | |
|---|---|---|---|
| 519,398 | 5/1894 | Thompson | 229—59 |
| 1,716,818 | 6/1929 | Hammond | 229—59 X |
| 3,117,711 | 1/1964 | Camerini | 229—57 |

FOREIGN PATENTS 969,586  6/1958  Germany.

FRANKLIN T. GARRETT, *Primary Examiner.*